(12) United States Patent
Lin (10) Patent No.: US 10,243,428 B2
(45) Date of Patent: Mar. 26, 2019

(54) FAN STRUCTURE

(71) Applicant: Global WIN Technology Co., Ltd., Taipei (TW)

(72) Inventor: Shih-Jen Lin, Taipei (TW)

(73) Assignee: Global Win Technology Co., Ltd., Taipei (TW)

( * ) Notice: Subject to any disclaimer, the term of this patent is extended or adjusted under 35 U.S.C. 154(b) by 334 days.

(21) Appl. No.: 15/293,842

(22) Filed: Oct. 14, 2016

(65) Prior Publication Data

US 2018/0106259 A1    Apr. 19, 2018

(51) Int. Cl.

| H02K 9/06 | (2006.01) |
| --- | --- |
| H02K 7/08 | (2006.01) |
| H02K 1/27 | (2006.01) |
| H02K 1/14 | (2006.01) |
| H02K 7/14 | (2006.01) |
| H02K 7/00 | (2006.01) |
| H02K 21/24 | (2006.01) |
| H02K 1/02 | (2006.01) |
| H02K 3/52 | (2006.01) |
| H02K 5/08 | (2006.01) |

(Continued)

(52) U.S. Cl.
CPC ........... *H02K 7/08* (2013.01); *F04D 25/0613* (2013.01); *F04D 29/626* (2013.01); *H02K 1/02* (2013.01); *H02K 1/14* (2013.01); *H02K 1/146* (2013.01); *H02K 1/27* (2013.01); *H02K 3/522* (2013.01); *H02K 5/08* (2013.01); *H02K 7/003* (2013.01); *H02K 7/14* (2013.01); *H02K 9/06* (2013.01); *H02K 11/215* (2016.01); *H02K 11/33* (2016.01); *H02K 21/24* (2013.01)

(58) Field of Classification Search
CPC ........ H02K 7/08; H02K 11/215; H02K 11/33; H02K 1/02; H02K 1/14; H02K 1/146; H02K 1/27; H02K 3/522; H02K 5/08; H02K 7/003; H02K 7/14; H02K 9/06; H02K 21/24; F04D 25/0613; F04D 29/626
USPC .......................................... 310/60 R, 156.32
See application file for complete search history.

(56) References Cited

U.S. PATENT DOCUMENTS

| 7,619,337 B2 * | 11/2009 | Kasai | ........................ H02K 3/47 |
| --- | --- | --- | --- |
| | | | 310/156.32 |
| 8,177,530 B2 * | 5/2012 | Horng | ................. F04D 25/0653 |
| | | | 310/156.32 |

(Continued)

*Primary Examiner* — Jianchun Qin
(74) *Attorney, Agent, or Firm* — Muncy, Geissler, Olds & Lowe, P.C.

(57) ABSTRACT

The present disclosure illustrates a fan structure which includes an outer shell member, a rotating module and a circuit module. The outer shell member has a receiving groove, and an axis part and a fastening part. The fastening part includes winding columns. The rotating module includes the fan, an axis coupling part pivotally connected with the axis part, and a magnetic part disposed on a periphery of the axis coupling part. The circuit module includes a circuit board which has positioning holes formed on and annularly arranged the surface thereof. Position-limiting caps are respectively mounted and fixed on the winding column after the winding columns are inserted through the positioning holes. A conductive wire is wound on the winding columns to form coils, and has two ends welded on the circuit board. Therefore, defect rate and assembly cost of production of fan structure of the present disclosure can be decreased.

10 Claims, 6 Drawing Sheets

(51) Int. Cl.
*H02K 11/215* (2016.01)
*H02K 11/33* (2016.01)
*F04D 25/06* (2006.01)
*F04D 29/62* (2006.01)

(56) References Cited

U.S. PATENT DOCUMENTS 9,551,348 B2 * 1/2017 Lin .......................... F04D 17/16
10,107,304 B2 * 10/2018 Tsai ...................... F04D 29/056

* cited by examiner

FAN STRUCTURE

BACKGROUND OF THE INVENTION

Field of the Invention

The present disclosure relates to a fan structure, more particularly to a fan structure including a circuit board which has a plurality of positioning holes formed and annularly arranged on a surface thereof and a plurality of winding columns respectively inserted through the plurality of positioning holes, and at least one conductive wire is wound on the plurality of winding columns to form a plurality of coils and has two head ends welded on a pre-determined control circuit of the circuit board. Therefore, the fan structure of the present disclosure can simplify the convention assembly way of winding the plurality of coils first at the outside and placing the wound coils on the circuit board later, so as to reduce the assembly cost of production of the fan structure.

Description of the Related Art

Currently, with advanced development of IT technologies, there is a trend to design an electronic device (such as a desktop computer, a notebook computer, a tablet computer or a smartphone) in a lighter weight, and a thinner and more compact size, such that the electronic device occupies a smaller space while being placed indoor and it is more convenient for person to carry the electronic device. As result, the designer always try to reduce size of the electronic device, even a 1 mm or 2 mm of length, width or thickness, and assembly and thicknesses of the electrical components inside the electronic device are also considered together.

Generally, the electronic devices generate heat during operation, so most of the electronic devices are provided with fans using brushless motors. Each of most fans using brushless motors has an outer shell member, an axis part disposed at inside wall of the outer shell member; and a washer, a magnetically-permeable member and a circular circuit board are sequentially mounted on a periphery of the axis part. The circuit board includes a plurality of coils and a detection element disposed thereon, and the axis part is pivotally connected with a fan which has an annular magnet disposed at an inner side thereof and correspondingly in position to the plurality of coils and the detection element. By using magnetizing manner, the magnet is formed with N magnetic poles and S magnetic poles staggered with each other.

In actual application, the fan with brushless motor uses the detection element to detect the variation of a magnetic field of the magnet (the variation between S and N magnetic poles), and according to the variation of the magnetic field of the magnet, the circuit board controls the plurality of coils to generate an alternate magnetic field, to sequentially repel the N magnetic pole and the S magnetic pole of the magnet, thereby driving rotation of the fan. As a result, rotation of fan can dissipate heat generated inside the electronic device.

However, in the process of combining the plurality of coils of the fan on the circuit board, at least one enamel insulated wire is wound to form the plurality of coils first, and the plurality of coils are then welded on the circuit board one by one; obviously, the combining process is very complicated and easily causes failure of welding, and spends a lot of labor and time costs, which results in high defect rate and assembly cost of the fan structure.

Therefore, what is need is to design a novel fan structure to decrease the high defect rate and the assembly cost due to the complicated process of manufacturing the plurality of coils of the fan with brushless motor and assembling the coils on the circuit board.

SUMMARY OF THE INVENTION

A primary objective of the present disclosure is to provide a fan structure including an outer shell member, a rotating module and a circuit module. The outer shell member includes a seat body which has a receiving groove recessed on a surface thereof, an axis part protruded on a bottom surface of the receiving groove, a fastening part disposed at the bottom surface of the receiving groove and around the axis part, and a plurality of winding columns disposed around the fastening part. The circuit module includes a circuit board which has a plurality of positioning holes formed and annularly arranged thereon. The plurality of winding columns are respectively inserted through the plurality of positioning holes, and at least one conductive wire is wound on the plurality of winding columns to form a plurality of coils and has two head ends welded on a pre-determined control circuit of the circuit board. Therefore, the convention assembly way of winding the plurality of coils first at the outside, placing the multiple head ends of the plurality of coils on the circuit board and welding them later can be simplified, so as to decrease a defect rate and an assembly cost of production of the fan structure.

A secondary objective of the present disclosure is that the fastening part of the seat body has two fastening columns disposed at a side of the plurality of winding columns, and during wire-winding operation, an end of the at least one conductive wire is wound and fixed on one of the two fastening columns, and other end of the at least one conductive wire is wound on the plurality of winding columns to form the plurality of coils, and then wound and positioned on the other of the two fastening columns. Therefore, that the end of the at least one conductive wire is wound and fixed on one of the two fastening columns prior to the at least one conductive wire being wound on the plurality of winding columns to form the plurality of coils, can prevent the problem that the wound conductive wire becomes loose or the two head ends become messy in their locations because of two head ends of the at least one conductive wire not being fixed, thereby facilitating to wind the plurality of coils and further improving speed and accuracy of the wire-winding operation. Furthermore, two head ends of the at least one conductive wire are respectively fixed on the fastening column, so it is convenient to weld the two head ends on the circuit board, so as to further improve operability and convenience of the wire-winding operation.

BRIEF DESCRIPTION OF THE DRAWINGS

The detailed structure, operating principle and effects of the present invention will now be described in more details hereinafter with reference to the accompanying drawings that show various embodiments of the invention as follows.

DETAILED DESCRIPTION OF THE PREFERRED EMBODIMENTS

The technical content of the present invention will become apparent by the detailed description of the following embodiments and the illustration of related drawings as follows.

Please refer to FIGS. 1 through 4 which show an elevational view, a perspective exploded view, another perspective exploded view when viewed from another angle, and a sectional side view, of the fan structure of the present disclosure, respectively. The fan structure of the present disclosure includes an outer shell member 1, a rotating module 2 and a circuit module 3.

The outer shell member 1 includes a seat body 11, a lid 12 and a magnetically-permeable member 13. The seat body 11 has a receiving groove 110 recessed on a surface thereof, and an axis part 111 protruded at a bottom surface of the receiving groove 110, and a fastening part 112 disposed at the bottom surface of the receiving groove 110 and around the axis part 111. The axis part 111 has an axis hole 1110 recessed at a top thereof. A plurality of winding columns 1121 are protruded on the fastening part 112, and two fastening columns 1122 are protruded at a side of the plurality of winding columns 1121. The seat body 11 further has a plurality of first vents 113 formed on the bottom side of the receiving groove 110 and located at a periphery of the fastening part 112. The seat body 11 has a plurality of grooves 114 disposed at a periphery thereof, and each of the grooves 114 is formed with a buckle 1141 protruded at a surface thereof. The seat body 11 has an opening 115 formed at an external side thereof and in communication with the receiving groove 110, and a recess 116 disposed at a surface of an external side thereof and correspondingly in position to the axis part 111. The lid 12 has a second vent 121 disposed at a surface thereof, and a plurality of plates 122 disposed at a periphery thereof and bent to respectively extended into the grooves 114, and each of the plurality of plates 122 has a buckle hole 1221 formed at a surface thereof and configured to fastened with the buckle 114. The magnetically-permeable member 13 is fastened in the recess 116.

The rotating module 2 includes a fan 21, an axis coupling part 22 and a magnetic part 23. The fan 21 is received in the receiving groove 110 of the seat body 11, and has a connecting groove 211 recessed on a side surface thereof. A plurality of fan blades 212 are disposed around a periphery of the fan 21 and arranged adjacent to each other. The axis coupling part 22 includes a washer 221 and a bearing 222 received in the axis hole 1110, and a shaft core 223 inserted through the bearing 222 and fixed with a center of the fan 21. The magnetic part 23 includes a holding disk 231 and an annular magnet 232. The holding disk 231 is mounted in the connecting groove 211, and has a docking slot 2310 recessed on a surface thereof and a through hole 2311 formed at a surface of a central part of the docking slot 2310. The annular magnet 232 is assembled and fixed in the docking slot 2310 of the holding disk 231, and has magnetic parts 2321 with south magnetic pole and magnetic parts 2322 with north magnetic pole staggered in arrangement.

The circuit module 3 includes a circuit board 31, a coil 32 and a detection element 33. The circuit board 31 is in a circular board shape and has a through hole 311 formed at a surface of a center thereof and cut therethrough, and a plurality of positioning holes 312 formed annularly around the through hole 311. The axis part 111 is inserted through the through hole 311, and the plurality of winding columns 1121 and the two fastening columns 1122 are inserted through the plurality of positioning holes 312. The circuit board 31 includes a plurality of position-limiting caps 313 disposed correspondingly in position to the plurality of positioning holes 312 and configured to mount with the plurality of winding columns 1121, and at least one conductive wire wound on the plurality of winding columns 1121 to form the plurality of coils 32 and having two head ends 321 extended to respectively wind and fix on the two fastening columns 1122 and welded on the circuit board 31. The circuit board 31 further includes the detection element 33 welded on the surface thereof and adjacent to the plurality of positioning holes 312. A circuit configuration among the circuit board 31, the plurality of coils 32 and the detection element 33 are predetermined, and the detection element 33 can be a Hall sensor chip configured to sense a magnitude of a magnetic field.

In a preferred embodiment of the present disclosure, the seat body 11 has the fastening part 112, and the plurality of winding columns 1121 and two fastening columns 1122 annularly disposed on the surface thereof. The winding columns 1121 and the two fastening columns 1122 can be formed integrally with the fastening part 112. The circuit board 31 is placed into the receiving groove 110 of the seat body 11, such that the plurality of winding columns 1121 and the two fastening columns 1122 are respectively inserted through the plurality of positioning holes 312, and the plurality of position-limiting caps 313 are mounted on and fixed with the plurality of winding columns 1121. Next, at least one conductive wire is wound and fixed on one of the fastening columns 1122, and then wound on the plurality of winding columns 1121 to form the plurality of coils 32, and then wound and positioned on the other of the two fastening columns 1122. The two head ends 321 of the conductive wire are welded on the predetermined control circuit of the circuit board 31 to form electrical connection. As a result, the step of placing the plurality of coils 32 on the circuit board 31 can be omitted, and the labor cost of welding the two head ends 321 of multiple conductive wires on the circuit board 31 one by one can also be omitted, so that the defect rate and assembly cost of production of the fan structure can be reduced.

While the winding operation is performed, an end of the at least one conductive wire is fixed on one of the two fastening columns 1122 first, and other end of the conductive wire is wound on the plurality of winding columns 1121 to form the plurality of coils 32, and other end of the conductive wire is then wound and positioned on the other of the two fastening columns 1122. The at least one conductive wire is fixed on the fastening column 1122 first, so when the at least one conductive wire is being wound on the plurality of winding columns 1121 to form the plurality of coils 32, a problem that the wound conductive wire becomes loose or the two head ends 321 become messy in their location because of the two head ends 321 of the at least one conductive wire not being fixed will not occur, so as to facilitate to wind the plurality of coils 32, and further improve speed and accuracy of the wire-winding operation. Furthermore, the two head ends 321 of at least one conductive wire are respectively fixed on the fastening column 1122, so it is convenient to weld the two head ends 321 on the circuit board 31, so as to further improve operability and convenience of the wire-winding operation.

Preferably, the axis part 111 of the outer shell member 1 of the present disclosure has the axis hole 1110. In the rotating module 2, the axis coupling part 22 at the center of the fan 21 is positioned at the axis hole 1110 of the axis part 111 by mounting the shaft core 223 into the bearing 222, such that the axis coupling part 22 is rotatable in the axis part 111 for normal work of the fan 21; however, in actual application, the axis part 111 of the outer shell member 1 can also be provided with a shaft core (not shown in figures), and after the shaft core is mounted into the bearing, and the shaft core is positioned in the corresponding axis hole of the axis coupling part 22 by the bearing, that is, the location of the shaft core can be changed in cooperation with the bearing and the axis hole, such that the fan 21 can be rotatable by means of pivotally connecting the axis coupling part 22 with the axis part 111 of the outer shell member 1.

The fan structure of the present disclosure can be equipped in a computer, a notebook computer or any kind of electronic device (not shown in figures) for heat dissipation; in actual application, the detection element 33 on the circuit board 31 is used to detect the magnitude of the magnetic field of the magnet 232 disposed above, so as to recognize whether the magnetic part over the detection element 33 is the magnetic part 2321 with south magnetic pole or the magnetic part 2322 with north magnetic pole, so as to generate turn-on/off information while the plurality of coils 32 of the circuit board 31 is applied by an input voltage. While in use, the circuit board 31 controls the plurality of coils 32 to generate an alternate magnetic field, to enable the plurality of coils 32 to sequentially attract and repel the magnetic part 2321 with south magnetic pole and the magnetic part 2322 with north magnetic pole of the magnet 232, so as to drive rotation of the fan 21 and further dissipate heat of the electronic device.

While the fan 21 is rotating, the plurality of first vents 113 serve as an air outlet, and the second vent 121 serves as an air inlet, so as to complete a structural design of an axial-flow fan (not shown in figures). In design of the axial-flow fan, the opening 115 is not necessary; however, if the seat body 11 has the opening 115 formed at the external side thereof and in communication with the receiving groove 110, as shown in FIGS. 1-4, the plurality of first vents 113 and the second vent 121 serve as the air inlet and the opening 115 serves as the air outlet, so as to complete a laterally-blowing function similar to that of a blower.

Figure 1:
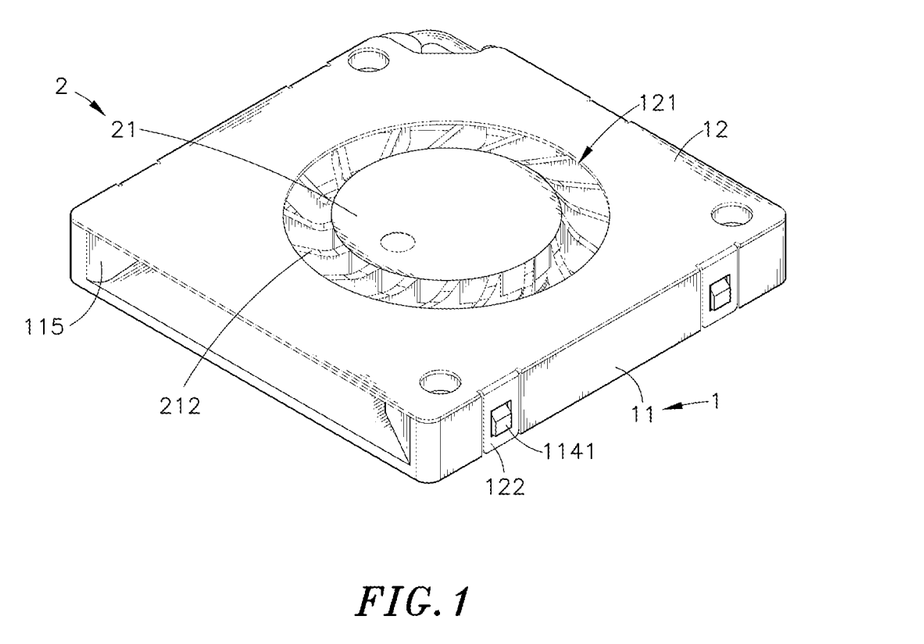
FIG. 1 is an elevational view of a fan structure of the present disclosure.
Figure 2:
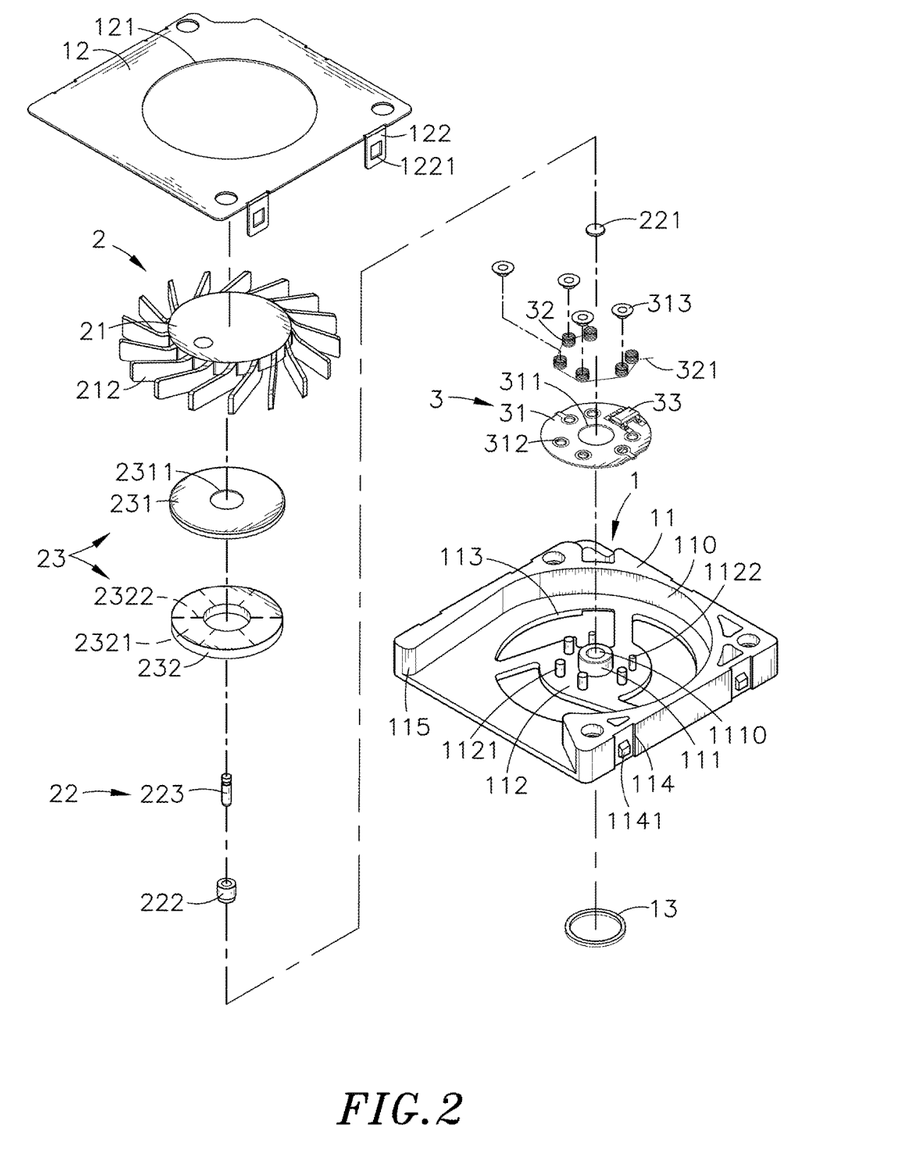
FIG. 2 is a perspective exploded view of the fan structure of the present disclosure.
Figure 3:
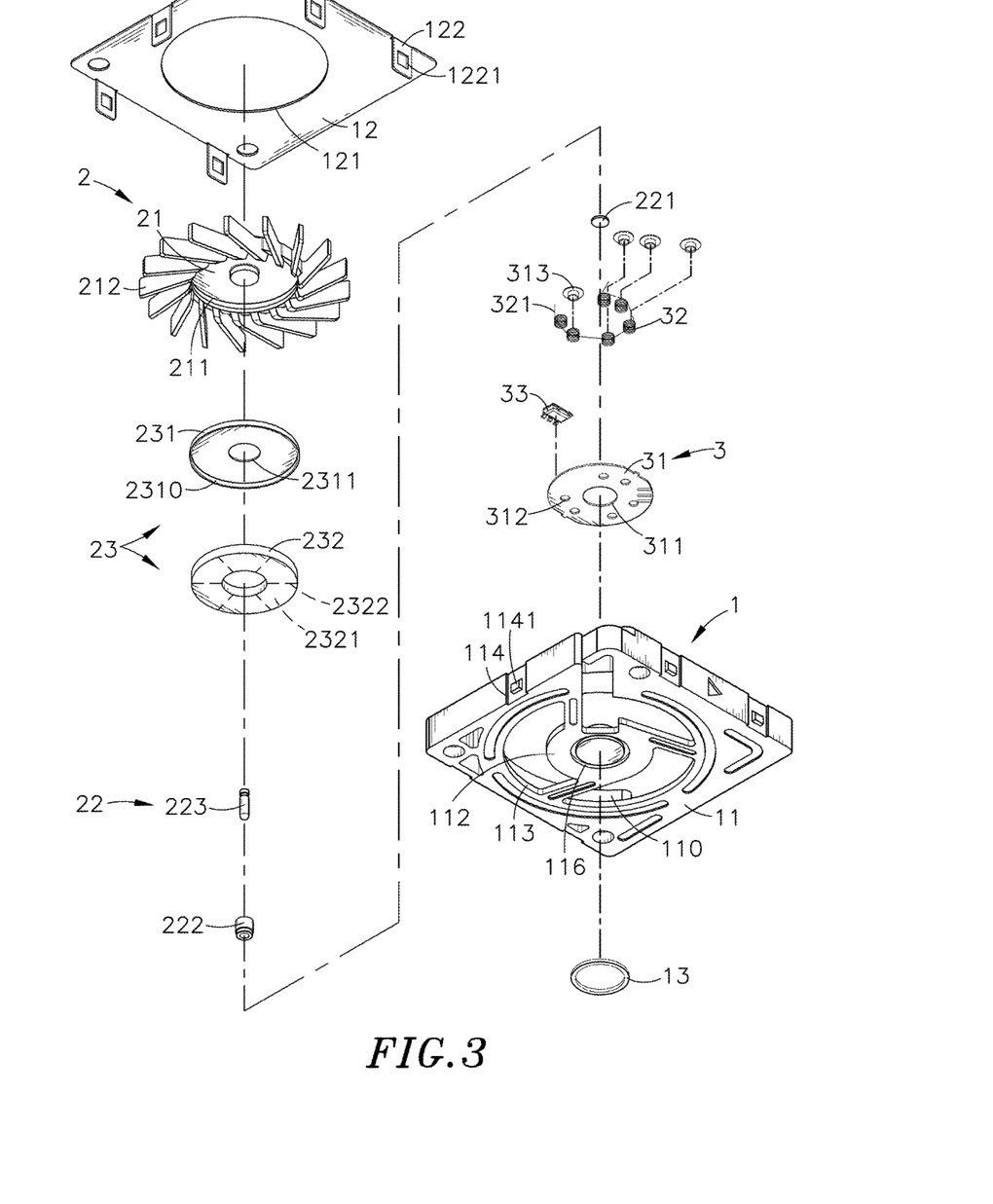
FIG. 3 is a perspective exploded view of the fan structure of the present disclosure, when viewed from another angle.
Figure 4:
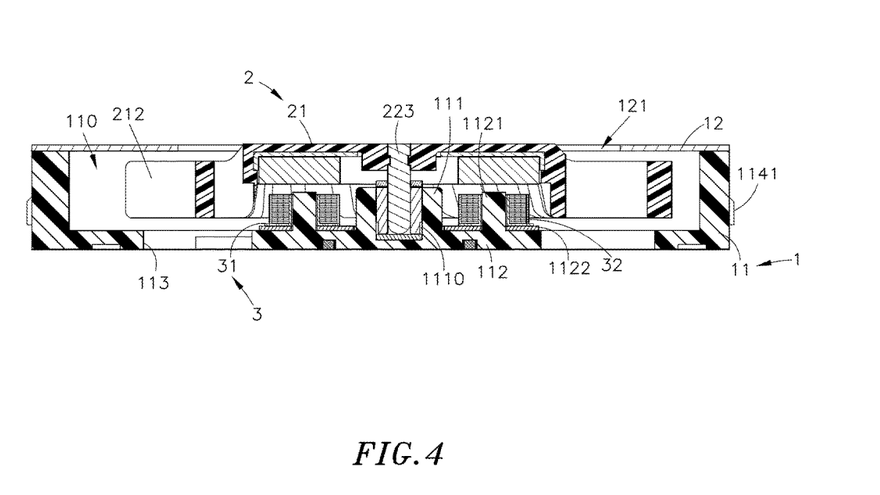
FIG. 4 is a sectional side view of the fan structure of the present disclosure.
Figure 5:
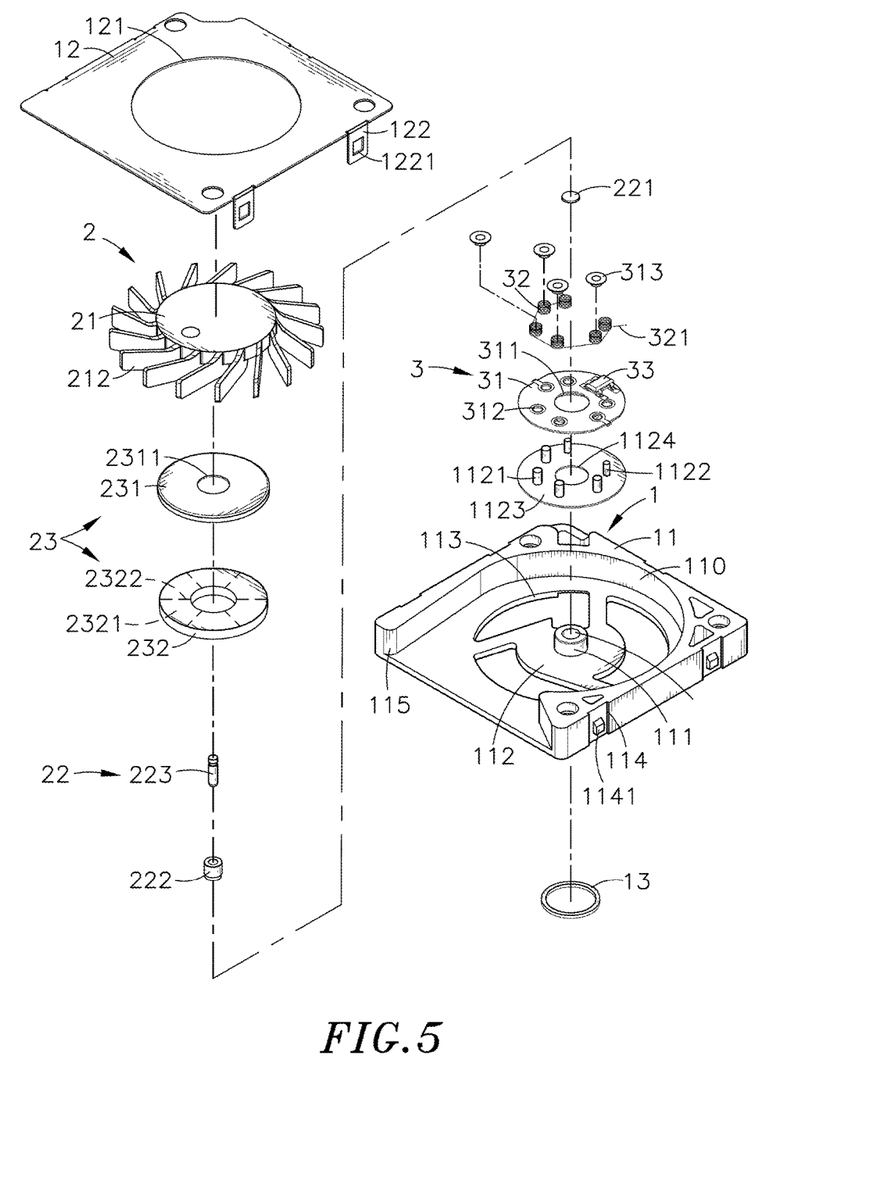
FIG. 5 is a perspective exploded view of another embodiment of the fan structure of the present disclosure.
Figure 6:
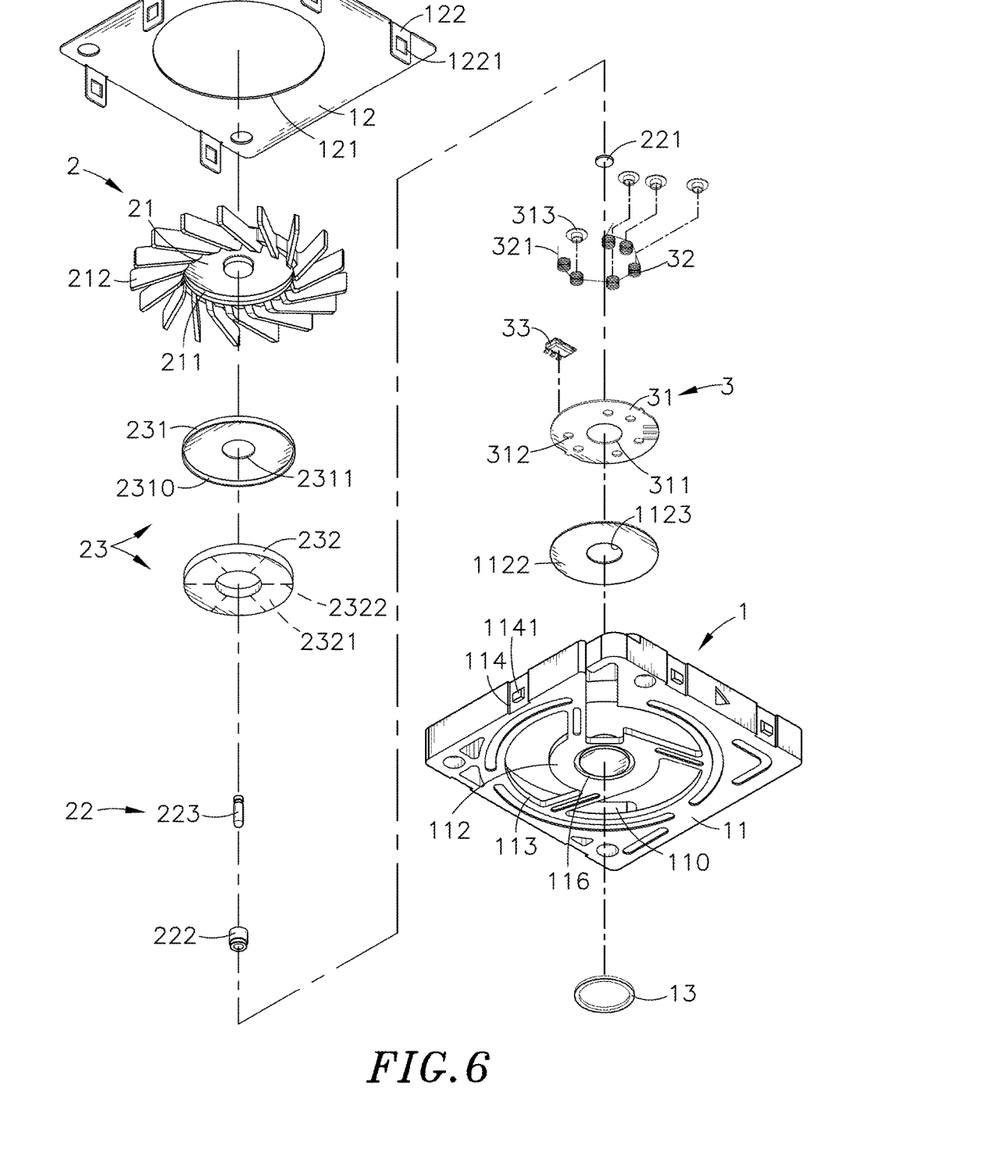
FIG. 6 is a perspective exploded view of the other embodiment of the fan structure of the present disclosure, when viewed from another angle.

Please refer to FIGS. 5 and 6 which show a perspective exploded view and other perspective exploded view when viewed from another angle, of other embodiment of the present disclosure. The plurality of winding columns 1121 of the seat body 11 and the fastening part 112 can be manufactured separately, and a fastening disk 1123 is in a circular-plate shape and disposed under the plurality of winding columns 1121 and the two fastening columns 1122. The two fastening columns 1122 and the fastening disks 1123 are formed integrally. The fastening disk 1123 is combined on the surface of the fastening part 112 by a bottom side thereof, and has a hole 1124 formed at a center of a surface thereof and configured for insertion of the axis part 111, and has the plurality of positioning holes 312. The plurality of winding columns 1121 and the two fastening columns 1122 are inserted out of the circuit board 31 through the plurality of positioning holes 312, and the plurality of position-limiting caps 313 over the circuit board 31 are mounted on and fixed with the plurality of winding columns 1121. At least one conductive wires is wound on the plurality of winding columns 1121 to form the plurality of coils 32, and the two head ends 321 of the at least one conductive wire is fastened on the two fastening columns 1122 and welded on the pre-determined control circuit of the circuit board 31. The bottom side of the fastening disk 1123 is combined on the surface of the fastening part 112 by using a manner of chemical adhesive bonding, welding, high frequency melting or the like.

In other embodiment, the fastening disk 1123 can be taken out of the receiving groove 110, and the plurality of winding columns 1121 and the two fastening columns 1122 on the fastening disk 1123 are inserted through the plurality of positioning holes 312 of the circuit board 31, and the plurality of position-limiting caps 313 over the circuit board 31 are mounted and fixed on the plurality of winding columns 1121. The at least one conductive wire is then wound on the plurality of winding columns 1121 to form the plurality of coils 32, and the two head ends 321 of the at least one conductive wire are fastened on the two fastening column 1122 and welded on the pre-determined control circuit of the circuit board 31. The assembly of the circuit module 3 is not completed inside the receiving groove 110 of the outer shell member 1, so possibility of failure of assembly caused by constrained operation in small space of the receiving groove 110 during wire winding and welding processes is reduced, and a yield rate of the product can further be increased.

The above-mentioned embodiments are just taken as examples of the fan structure of the present disclosure, but the present disclosure is not limited thereto. The present disclosure is mainly to improve the fan structure. The fan structure includes an outer shell member 1, a rotating module 2 and a circuit module 3. The outer shell member 1 has a receiving groove 110 formed inside, an axis part 111 disposed on the bottom surface thereof, and a fastening part 112 disposed on the bottom surface thereof and around the receiving groove 110. The fastening part 112 includes a plurality of winding columns 1121. The rotating module includes a fan 21 and an axis coupling part 22 pivotally connected with the axis part 111. The circuit module 3 includes a circuit board 31 mounted on the periphery of the axis part 111, and the circuit board 31 has a plurality of positioning holes 312 formed on and annularly arranged the surface thereof. A plurality of position-limiting caps 313 are respectively mounted on the plurality of winding column 1121 which are inserted through the plurality of positioning holes 312. The at least one conductive wire is directly wound on the plurality of winding columns 1121 to form a plurality of coils 32, and two head ends 321 of the at least one conductive wire are welded on the pre-determined control circuit of the circuit board 31. In the conventional way of assembling the fan structure, the plurality of coils 32 are wound first and placed on the circuit board 31, and the two head ends 321 of the multiple conductive wires are welded on the circuit board 31 one by one; according to the fan structure of the present disclosure, the labor-consuming way is simplified, so that the assembly cost and defect rate can be reduced.

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:
1. A fan structure comprising an outer shell member, a rotating module and a circuit module, wherein:

said outer shell member includes a receiving groove formed inside, an axis part protruded on a bottom side of said receiving groove, a fastening part disposed around said axis part, and a plurality of winding columns protruded on a surface of said fastening part and disposed adjacent to and around said axis part;

wherein said rotating module includes a fan and a magnetic part disposed around a periphery of an axis coupling part, said fan has said axis coupling part pivotally connected to said axis part, and said magnetic part includes south magnetic portions with south magnetic pole and north magnetic part portions with north magnetic pole; and wherein said circuit module includes a circuit board mounted on a periphery of said axis part, and a plurality of positioning holes formed on a surface of said circuit board and configured for insertion of said plurality of winding columns, and at least one conductive wire directly wound on said plurality of winding column which is inserted through said plurality of positioning holes, to form a plurality of coils, and a detection element welded on the surface of said circuit board and adjacent to said plurality of positioning holes.

2. The fan structure according to claim 1, wherein said outer shell member has a recess formed on an external side surface thereof and correspondingly in position to said axis part, and a magnetically-permeable member is disposed in said recess and configured to attract said magnetic part.

3. The fan structure according to claim 1, wherein said axis part has an axis hole recessed at a top thereof, and said axis coupling part includes a washer and a bearing disposed in said axis hole, and a shaft core is disposed and inserted through in said bearing, and protruded towards said fan, and said circuit board is in a circular-plate shape and has a through hole formed at a center of the surface thereof and configured for insertion of said axis part.

4. The fan structure according to claim 1, wherein said outer shell member includes a seat body which has said receiving groove recessed on a surface thereof, and said receiving groove is formed with a plurality of first vents at the periphery of said axis part and corresponding in position to said fan, and a lid is mounted above said receiving groove of said seat body and has a second vent formed on a surface thereof and corresponding in position to said fan.

5. The fan structure according to claim 1, wherein a seat body has an opening formed at an external side thereof and in communication with said receiving groove.

6. The fan structure according to claim 1, wherein said fan has a connecting groove recessed on a surface thereof and adjacent to the periphery of said axis coupling part, and said magnetic part includes a holding disk mounted in said connecting groove, and said holding disk has a docking slot recessed on a surface thereof and a through hole formed at a center of the surface thereof and configured for insertion of said axis coupling part, and an annular magnet is disposed in said docking slot and includes magnetic portions with south magnetic pole and magnetic portions with north magnetic pole staggered along the periphery of said axis part.

7. The fan structure according to claim 1, wherein said fastening part of a seat body and said plurality of winding columns are formed integrally, and said plurality of winding columns are annularly arranged around said axis part, and further respectively positioned in said plurality of positioning holes of said circuit board.

8. The fan structure according to claim 1, wherein said fastening part of a seat body includes two fastening columns protruded at a side of said plurality of winding columns, and said circuit board has said plurality of positioning holes arranged around a through hole for insertions of said two fastening columns, the at least one conductive wire is wound on said plurality of winding columns to form said plurality of coils, and two head ends of the at least one conductive wire is respectively wound and fixed on said two fastening columns and then welded on said circuit board.

9. The fan structure according to claim 1, wherein said circuit board of said circuit module includes a plurality of position-limiting caps configured to mount with tops of said plurality of winding columns which are inserted out of said plurality of positioning holes of said circuit board.

10. The fan structure according to claim 1, wherein a seat body includes a fastening disk disposed under said plurality of winding columns, and said seat body and said fastening disk are formed integrally, and said plurality of winding columns and said fastening part are manufactured separately, said fastening disk is combined on the surface of said fastening part by a bottom side thereof, and said plurality of winding columns are inserted out of said plurality of positioning holes of said circuit board for being positioned.

* * * * *